United States Patent Office 2,739,138
Patented Mar. 20, 1956

2,739,138

SYNTHETIC RUBBER LATICES

Morris S. Kharasch and Walter Nudenberg, Chicago, Ill., assignors, by mesne assignments, to Emulsol Chemical Corporation, Chicago, Ill., a corporation of Illinois No Drawing. Application October 10, 1951, Serial No. 250,802

11 Claims. (Cl. 260—29.7)

The invention described herein, if patented, may be manufactured and used by or for the Government of the United States of America for governmental purposes, without the payment to us of any royalty thereon.

Our invention relates to the preparation of synthetic latices derived from the copolymerizing of butadiene-1,3 (hereafter denoted as butadiene) with styrene wherein the butadiene predominates in amount over the styrene. It is especially concerned with the preparation of such synthetic latices by emulsion polymerization.

Synthetic latices, prepared by the emulsion polymerization of butadiene with styrene, wherein the butadiene predominates over the styrene, have been well known for a substantial period of time. Typical of such products are the buna S latices, now more commonly designated as GR–S latices. It has become conventional practice to prepare such latices by polymerizing the butadiene and styrene in aqueous emulsions containing a variety of addition agents as, for example, activators, regulators, oxidizing agents, and emulsifying agents.

Among the emulsifying agents which have been suggested for use are, for example, water-soluble soaps such as the alkali metal oleates and stearates, sulfates of higher fatty alcohols such as lauryl sodium sulfate, alkali metal salts of alkylated naphthalene sulfonates, sulfonated mineral oils, saponin, Turkey red oil, higher molecular weight amine salts such as dodecyl amine hydrochloride, polyether alcohols prepared by the condensation of, for example, ethylene oxide with fatty alcohols containing from 10 to 18 carbon atoms, and a host of other analogous and similar agents. More recently, the use of the potassium soaps or salts of disproportionated rosin acids has been suggested and the utilization thereof has gone into substantial commercial use. One commercial product of this type is sold under the name "Dresinate 731" which is manufactured by Hercules Powder Co. None of said agents has proven fully satisfactory and, indeed, a number of serious objections, in relation to one or more of the aspects of the use thereof, has arisen. Thus, for example, the soaps are required to be used in relatively substantial proportions and the stability of the latices and the fluidity thereof have left much to be desired. Furthermore, careful adjustment of pH values is necessary in order to get optimum results. Again, where so-called activator solutions of certain types, which are now in common usage, are employed, great care is required to be exercised in the manner in which the activator is prepared. One or more of these objections, as well as others, apply with respect to all of the emulsifying agents whose use has been suggested in emulsion polymerization procedures of the type here under discussion.

Within the past few years, it has become known that certain marked advantages arise, with respect to the properties of the synthetic rubbers, if the emulsion polymerization procedure is carried out in the cold. In this connection, it has become more or less standard practice to utilize temperatures of about 5 degrees C. to about 25 degrees C. and, where the polymerization reaction is carried out in the presence of anti-freeze addition agents as, for example, ammonia, materially lower temperatures can be utilized. With the advent of the carrying out of the polymerization reaction in the cold, certain additional problems have arisen with respect to the utilization of such agents as alkali metal soaps. It has been found, for example, that sodium soaps, such as sodium oleate, are unsatisfactory because, at the low temperatures at which they are used, they tend to gell. For this reason, where soaps have been employed, it has been necessary to use the potassium soaps as, for example, potassium oleate and the potassium soaps or salts of the disproportionated rosin acids. The necessity for the use of potassium soaps has materially increased the cost of carrying out the polymerization reaction since potassium soaps are substantially higher in cost than are the corresponding sodium soaps.

In accordance with our present invention, it has been found that if the polymerization reaction is carried out in the presence of certain agents, hereafter described in detail, a number of totally unexpected and marked advantages are obtained. In the first place, the butadiene-styrene synthetic rubber latices which are obtained in accordance with the practice of our invention have an enhanced stability. In the second place, they have an improved fluidity or, in other words, are characterized by appreciably lower viscosities than are found in conventionally prepared butadiene-styrene synthetic rubber latices. In the third place, they are markedly resistant to coagulation. In this connection, it may be pointed out that conventional butadiene-styrene synthetic rubber latices are usually precipitated or coagulated by the addition thereto of small amounts of acid and salt. In the case of the synthetic latices produced in accordance with our invention, the addition of conventional amounts of acid and salt will not coagulate the latices. They are also resistant to coagulation by various other agents which are effective in the case of heretofore known latices. The latices of the present invention may, however, readily be coagulated by the addition thereto of alum. In the fourth place, the agents are stable under stripping conditions. They do not hydrolyze nor in any way adversely affect the emulsion during the conventionally practiced procedures for stripping off the unreacted monomers after the completion of the polymerization reaction. In the fifth place, their use does not require any adjustment of pH of the polymerization mixture. Still another advantage of their use resides in the fact that the manner in which the activator solution is prepared is not critical. By way of illustration, it may be pointed out that, in the utilization of such activators as mixtures of alkali metal pyrophosphates, ferrous sulfate, and dextrose, it has been very important that such activator be made with very precise amounts of ferrous sulfate and preferably with potassium pyrophosphate. With the use of the agents of the present invention, it is immaterial whether potassium pyrophosphate or sodium pyrophosphate is employed and, furthermore, considerable leeway is possible in the utilization of proportions of ferrous sulfate since it appears that the agents seemingly have the effect of binding iron in an inactive form, at least to some extent, and, therefore, the percentages of ferrous sulfate utilized may be varied within appreciable limits without encountering any difficulties in the polymerization reaction. Still further and important advantages reside in the fact that the agents which are employed in accordance with our present invention can be and most advantageously are utilized in the form of their inexpensive sodium salts and, in addition, they can be utilized in the form of crude reaction mixtures, thereby avoiding the necessity for expense involved in the production of pure products. They thus bring about substantial savings in reagent cost in addition to possessing the various advantages which have been described above.

The agents which we utilize in accordance with our invention are derivatives of hydroxyalkyl primary amines in which amine hydrogen is replaced by an aliphatic carboxylic acid acyl radical containing from 8 to 24 carbon atoms and in which hydroxyl hydrogen is replaced by an aliphatic sulfopolycarboxylic acid acyl radical containing from 4 to 8 carbon atoms. A particularly preferred sub-group of such compounds comprises derivatives of mono-hydroxy alkyl primary monoamines in which amine hydrogen is replaced by a fatty acid radical containing from 12 to 18 carbon atoms and in which hydroxyl hydrogen is replaced by an aliphatic sulfodicarboxylic acid acyl radical containing from 4 to 8 carbon atoms. Illustrative examples of compounds which are utilized in accordance with our invention are the following, it being understood, of course, that mixtures of any two or more thereof can be employed and, in adidtion, as indicated above, said compounds can be employed in pure or impure form, the latter being exemplified by reaction mixtures resulting from the practice of processes for the preparation of said compounds where purification procedures for recovering the compounds in their pure form are not employed:

(1) Oleic acid amide of monoethanolamine sulfosuccinate (Na salt)

(2) Lauric acid amide of isopropanolamine sulfosuccinate (Na salt)

(3) Refined tall oil acid amides of isopropanolamine sulfosuccinate (Na salt)

(4) Oleic acid amide of isopropanolamine sulfosuccinate (Na salt)

(5) Oleic acid amide of 2-amino-2-methyl-1,3-propanediol monosulfosuccinate (Na salt)

(6) Myristic acid amide of isopropanolamine sulfoaconitate (K salt)

(7) Linoleic acid amide of 2-amino-2-methyl-1-propanol sulfosuccinate (monoethanolamine salt)

(8) Palmitic acid amide of 2-amino-1,3-propanediol monosulfoitaconate (9) Stearic acid amide of isopropanolamine sulfosuccinate (triethanolamine salt)

(10) Tung oil fatty acid amides of monoethanolamine sulfosuccinate (Na salt)

(11) Castor oil fatty acid amides of isopropanolamine sulfoglutarate (Na salt)

(12) Ricinoleic acid amide of isopropanolamine sulfosuccinate (diethanolamine salt)

(13) Oleic acid amide of isopropanolamine sulfosuccinate (isopropylamine salt)

(14) Oleic acid amide of 2-amino-1-propanol sulfosuccinate (NH₄ salt)

The agents which are utilized in accordance with our present invention can be made in a variety of ways but it is particularly preferred that they be prepared by initially reacting the hydroxyalkyl primary amine with, for example, oleic acid at about 150–165 degrees C. for 3 to 4 hours to form the oleic acid amide. The latter is then reacted with a slight excess of maleic anhydride at about 60–80 degrees C. to produce the maleic acid half-ester of said amide. The sulfonic acid group is introduced by the reaction of the oleic acid amide of the maleic half-ester of the hydroxyalkyl primary amine by reaction with an aqueous solution of an alkali metal sulfite, for example, sodium sulfite, which serves also to convert the free carboxyl group of the maleic acid radical to the sodium salt. Illustrative examples of the preparation of the compounds are as follows:

*Example I*

(a) 25 grams of the coconut oil mixed higher fatty acid amides of monoethanolamine (consisting largely of the lauric acid amide of monoethanolamine) and 11 grams of maleic anhydride were mixed together and heated to 80 degrees C. for a few minutes with stirring.

(b) 10 grams of the product resulting from part (a) hereof were mixed with 10 grams of sodium sulfite dissolved in 40 cc. of water (50 degrees C.) and the mixture was warmed to 60 degrees C.–70 degrees C., with stirring, for a few minutes. It was a liquid, soluble in water. The reaction product comprises essentially a compound having the following formula:

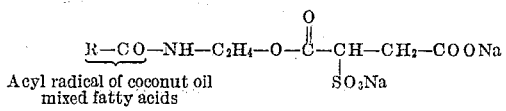

Acyl radical of coconut oil mixed fatty acids

*Example II*

216 grams of maleic acid ester of the coconut oil mixed fatty acid amides of monoethanolamine, 150 grams of sodium sulfite and 400 cc. of water were heated and stirred at a temperature from 60 degrees C. to 65 degrees C. for a period of about 10 minutes. The reaction mass was a paste which contained a substantial proportion of a compound having the following formula:

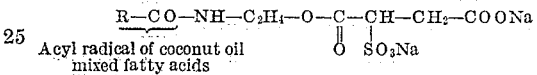

Acyl radical of coconut oil mixed fatty acids

*Example III*

(a) To 76 grams of a 23.6% aqueous solution of 1,3 di-amino propanol-2, 87.2 grams of lauroyl chloride were added dropwise, the temperature being maintained between 25 degrees C. and 35 degrees C. by means of a cold water bath. Simultaneously with the dropwise addition of the lauroyl chloride a 16% aqueous solution of sodium hydroxide was added dropwise in order to neutralize the hydrochloric acid which formed in the reaction. During the reaction, 400 cc. of water were added intermittently in order to maintain the precipitate which formed in dispersible condition. When the reaction was substantially complete, 15 cc. of a 20% aqueous solution of sodium hydroxide were added in order to neutralize the mass of phenolphthalein.

The reaction product was then mixed with water up to a volume of 1500 cc. and 15 cc. of concentrated hydrochloric acid were added to render the solution just acid to methyl red. The solution was then cooled to room temperature and filtered. The precipitate was washed with 1500 cc. of cold water and the mass was again filtered and dried. The residue was then washed with 1500 cc. of petroleum ether and was filtered and dried, the dried product having the formula:

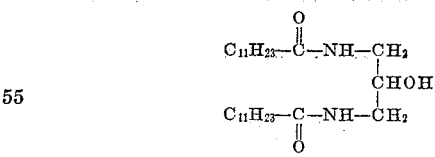

(b) 13 grams of the dried amide, produced as described in part (a) hereof, and 6 grams of maleic anhydride were heated, with stirring, up to 150 degrees C. and held for 5 minutes at such temperature. On cooling, the product was a brown, viscous syrupy liquid. 10 grams of this product, 10 grams of sodium sulfite and 20 cc. of water were heated up to 60 degrees C.–70 degrees C. and maintained at such temperature, with stirring, for approximately 10 minutes. The resulting reaction mass was a heavy paste, soluble in water, and contained a substantial proportion of a compound having the formula:

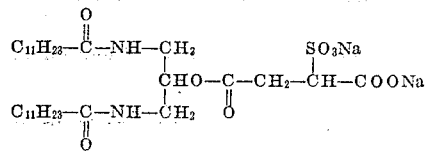

Example IV (a) 17 grams of aconitic acid and 10 grams of acetyl chloride were refluxed together for about an hour or until the mixture became a clear solution. The reaction product was freed from excess acetyl chloride and acetic acid which is formed during the reaction by subjecting the same to a vacuum while maintaining it on a hot water bath. The residue obtained comprised essentially aconitic anhydride.

(b) To the aconitic anhydride obtained in part (a) hereinabove, 12 grams of the amide of coconut oil mixed fatty acids with monoethanolamine were added and the mass heated to 110 degrees C., with stirring. The temperature spontaneously rose to 120 degrees C. and the mass was maintained at such temperature for about 10 minutes. The resulting product was a reddish viscous syrup.

(c) 15 grams of the reaction product produced in part (b) hereinabove, 14 grams of sodium sulfite and 40 cc. of water were heated to between 60 degrees C. and 65 degrees C. and maintained at such temperature for about 5 minutes, the reaction mass being constantly stirred. The final product was a relatively clear liquid and contained a substantial proportion of a compound having the following probable formula:

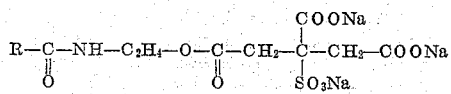

Those of the compounds which are freely soluble in water may be recovered from their solutions in the customary manner by concentration and crystallization. As the mass of the fatty acid radical increases, solubility decreases and affinity for water is manifested by the dispersibility in water. From these dispersions, the compounds may be readily recovered by "salting out" with suitable soluble electrolytes. Common salt is very satisfactory for the purpose in most cases. When salted out of an aqueous dispersion at temperatures ranging from 60 to 95 degrees C., the compounds are obtained in the form of a paste with a water content ranging from approximately 25 to 75%. As stated, the compounds need not be purified and can be used just as they are produced in the form of crude aqueous solutions or dispersions.

The hydroxyalkyl primary amines which are utilized in the production of the agents or compounds employed by us in accordance with our present invention can be selected from a large group, illustrative examples of which are monoethanolamine, monopropanolamine, isopropanolamine, butanolamine, isobutanolamine, monopentanolamine, monohexanolamine, hydroxyalkyl ethylenediamine, glycerol monoamine, 2-amino-2-methyl-1,3-propanediol; 2-amino-2-ethyl-1,3-propanediol; 2-amino-2-methyl-1-propanol; 2-amino-1-propanol; 2-amino-1,3-propanediol; 3-amino-3-methyl-2-butanol; 2-amino-1-butanol; 2-amino-1-pentanol; 2-amino-2-propyl-1,3-propanediol; 2-amino-2-methyl-1,6-hexanediol; 1-amino-1,1-dimethyl ethanol, and the like as well as mixtures of any two or more thereof. Especially satisfactory are monoethanolamine and isopropanolamine.

Among the aliphatic carboxylic acids containing from 8 to 24 carbon atoms, or derivatives of such acids in the form of their acyl halides or esters, for example, triglycerides, which are amidified with the hydroxyalkyl primary amine of the compounds used in accordance with our present invention are, for example, straight chain and branched chain acids, particularly fatty acids, saturated and unsaturated, such as caprylic acid, capric acid, behenic acid, arachidic acid, erucic acid, stearic acid, oleic acid, ricinoleic acid, linoleic acid, linolenic acid, elaeostearic acid, lauric acid, myristic acid, palmitic acid, clupanodonic acid, Neofat #19 acids which apparently comprise unsaturated fatty acids containing from 20 to 22 carbon atoms with 3 to 4 double bonds and minor proportions of other fatty acids such as oleic, linoleic and linolenic, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, linseed oil, tung oil, perilla oil, oiticica oil, dehydrated castor oil, china wood oil, sardine oil, tallow, soya bean oil, peanut oil, castor oil, seal oil, whale oil, shark oil, partially or completely hydrogenated animal and vegetable oils such as those mentioned; oxidized and/or polymerized higher fatty acids or higher fatty acids derived from oxidized and/or polymerized triglyceride oil; hydroxy and alpha-hydroxy higher aliphatic and fatty acids such as i-hydroxy stearic acid, di-hydroxy stearic acid, alpha-hydroxy stearic acid, alpha-hydroxy palmitic acid, alpha-hydroxy lauric acid, alpha-hydroxy coconut oil mixed fatty acids, and the like; and aliphatic carboxylic acids derived, by oxidation and other methods, from petroleum. Especially satisfactory are oleic acid or acid mixtures high in oleic acid content.

The length of the carboxylic acid chain of the carboxylic acid radical which is amide-linked to the hydroxyalkyl primary amine, in the agents utilized in accordance with our present invention, affects the extent of polymer conversion in a specified period of time. Thus, for example, where the aliphatic carboxylic acid acyl radical contains from 8 to 10 carbon atoms, conversion takes place relatively slowly. Where the chain length of the aliphatic carboxylic acid acyl radical is 12 carbon atoms, the speed of conversion increases appreciably. Hence, it is particularly desirable to utilize those agents wherein the length of the chain is at least 12 carbon atoms and preferably is within the range of 12 to 18 carbon atoms. Especially satisfactory results are obtained where the carboxylic acid acyl radical is unsaturated and contains predominantly 18 carbon atoms.

The aliphatic sulfopolycarboxylic acid acyl radicals of the compounds used in accordance with our present invention can be derived from a relatively large group of sulfopolycarboxylic acids, illustrative examples of which are sulfofumaric acid, sulfomaleic acid, sulfosuccinic acid, sulfomalonic acid, sulfoglutaric acid, sulfoadipic acid, sulfopimelic acid, sulfoazelaic acid, sulfocitraconic acid, sulfomesaconic acid, sulfosuberic acid, sulfoitaconic acid, sulfoglutaconic acid, sulfomucic acid, and the like, as well as mixtures of any two or more thereof. Especially satisfactory results are obtained with the sulfosuccinic acid derivatives.

It is especially desirable to utilize the agents in the form of their sodium salts, primarily because of economic considerations. Other salts of said agents can, however, be employed as, for example, potassium, ammonium, amine, and other salts. The reference to the compounds in the claims will be understood to encompass the salts of the compounds which are compatible with the other ingredients present in the polymerization reactant mixtures and effective for our present purposes.

As we have previously pointed out, it is unnecessary to utilize the agents in the form of their pure compounds. We have obtained very satisfactory results by employing a reaction mixture, in the form of an aqueous solution, containing about 35% to 37% of the active agent, for example, the oleic acid amide of isopropanolamine sulfosuccinate (sodium salt), said solution containing a total of about 40% of solids, the balance of said solids over and above the active material comprising unreacted intermediates such as the oleic acid esteramide of isopropanolamine, etc.

We have found that, in certain instances, it is advantageous to utilize the agents which we have described above in conjunction with soaps or other emulsifying agents whose use in the emulsion polymerization reaction has heretofore been suggested. We have found, for example, in certain formulations, that it is particularly desirable to utilize said agents in the polymerization reaction in conjunction with alkali metal soaps, particularly such soaps as potassium oleate, the potassium soaps or salts of disproportionated fatty acids, the potassium soaps of tall oil acids, and, in general, soaps of unsaturated higher molecular weight acids, particularly where the emulsion polymerization reaction is carried out in the cold.

As we have previously pointed out, our present invention is directed to the production of synthetic latices by the copolymerization of butadiene and styrene wherein the butadiene predominates in amount over the styrene. For most purposes, particularly where synthetic rubber latices are desired falling into the category of the GR-S type, the butadiene will represent from about 70% to about 75% by weight of the mixture of the butadiene and styrene monomers. For certain special types of synthetic latices, the butadiene can be just in excess of 50% or, in other special cases, it can appreciably exceed 80% of the monomer mixture. It will also be understood that minor proportions of monomers which are copolymerizable with the butadiene and styrene, by emulsion polymerization procedures, can also be utilized in conjunction with the butadiene and styrene, but, so far as our present invention is concerned, it is preferred that such additional monomers be substantially absent, and in no case should exceed about 3% or 4%.

The proportions of the added agent are, in all cases, small but are variable within appreciable limits. In general, it is unnecessary to exceed about 4%, based on the weight of the butadiene and styrene monomers used in the polymerization reaction, and, in most cases, depending upon the particular agent selected, good results are obtained utilizing proportions of the order of about 0.3% to 2%. A good working range is about 0.2% to about 4%. Where said agents are utilized in conjunction, for example, with alkali metal soaps, a good working range comprises about 1% to about 4% of the alkali metal soaps in conjunction with about 0.2% to about 4% of one or more of the aforesaid agents, said proportions being based, as previously indicated, on the weight of the butadiene and styrene monomers, said soap and said amide being present in a total amount not substantially exceeding 4%. In general, the utilization of lesser proportions of said agents tends to require longer polymerization periods in order to obtain a given amount of conversion. Thus, for example, if a conversion of the order of 70% is desired in a period of about 14 to 16 hours, at a polymerization temperature of say 5 degrees C., appropriate proportions of the agent as such or in conjunction with an alkali metal soap or the like can readily be determined by simple preliminary test.

The polymerization can be carried out in either a neutral, slightly alkaline or a slightly acid medium. In general, a preferred range of pH values is about 7 to about 9. As previously pointed out, however, it is unnecessary to take any steps to control the pH at which the polymerization is carried out in accordance with our invention since, whatever the pH happens to be which results from the intermixture of the polymerization reactant materials, the agents which are utilized in accordance with our invention are highly effective.

As we have previously indicated, our invention finds particular utility in those instances wherein the polymerization reaction is carried out at relatively low temperatures or in the cold. While, in certain instances, the polymerization reaction may be carried out at temperatures as high as about 50 degrees C., we find it especially advantageous, with the agents whose use is described in detail herein, to carry out the polymerization reaction at temperatures in the range of about —15 degrees C. to +25 degrees C. Temperatures of the order of about 2 degrees C. are about as low as can be utilized without the addition of anti-freeze agents to the polymerization reactant mixture. Where, however, anti-freeze agents are employed, as, for example, ammonia or other equivalent agents, materially lower temperatures can be employed as, for example, —15 degrees C. and lower, and the agents which are utilized herein continue to function most effectively. Where relatively elevated temperatures are used in carrying out the polymerization reaction, for instance of the order of 50 degrees C., the activators of the type shown in the following specific examples should be omitted and the cumene hydroperoxide should be replaced by such inorganic oxidizing agents as potassium persulfate.

It will be understood that the usual oxidizing agents, regulators, stabilizers, and activators, as well as other supplemental agents conventionally used in emulsion polymerization procedures, can be employed in accordance with our invention and we make no claim to any novelty therein. Among the oxidizing agents are, for example, hydrogen peroxide, perborates and persulfates of the alkali metals, organic peroxides such as benzoyl peroxide, cumene hydroperoxide, N-octyl dimethyl methyl hydroperoxide, etc. Among the regulators are diisopropyl xanthate and the higher mercaptans such as benzyl mercaptan, octyl mercaptan, decyl mercaptan, dodecyl mercaptan, cetyl mercaptan, octadecyl mercaptan or mixtures of said mercaptans; carbon tetrachloride, ethylene dichloride, hexachloroethylene; $C_5$ to $C_8$ aliphatic alcohols, and the like. Among the stabilizers are, by way of illustration, gelatin, glue, casein, starch and methyl cellulose. In the usual case, such stabilizers are unnecessary but they can, if desired, be added in their usual small proportions.

The following examples are illustrative of the production of synthetic rubber latices falling within the scope of our invention. It will, of course, be appreciated, in the light of the teachings contained herein, that other formulations can be utilized wherein the proportions of reactants will vary, wherein reaction times and temperatures are changed, wherein different orders of mixing the reactants are utilized, and wherein different addition agents such as the regulators, oxidizing agents, activators and the like are employed. These and other variations and modifications will be evident to those skilled in the art in the light of the guiding principles which are disclosed herein. All parts recited in the examples are by weight.

*Example A*

| | |
|---|---|
| Butadiene | 70.0 |
| Styrene | 30.0 |
| Water (redistilled) | 180.0 |
| Sulfole B-8 (mixture of $C_8$ and $C_{12}$ tertiary mercaptans) | 0.24 |
| Oleic acid amide of isopropanolamine sulfosuccinate (Na salt) in the form of a 35% active aqueous solution (pH 5.5 to 6) | [1] 3.76 |
| $Na_4P_2O_7 \cdot H_2O$ | 0.4 |
| $FeSO_4 \cdot 7H_2O$ | 0.176 |
| Dextrose | 0.4 |
| KCl | 0.1 |
| Cumene hydroperoxide | 0.1 |
| Temperature _____ degrees C | 2 to 4 |
| Time _____ hours | 14.5 |
| Conversion _____ percent | 85 |

[1] Active agent comprises 1.31.

The reactor is flushed out with nitrogen gas and the subsequent charging and polymerization reaction are so carried out as to eliminate the presence of oxygen to the extent reasonably possible. The aqueous solution containing the oleic acid amide of isopropanolamine sulfosuccinate (Na salt) is charged into the reactor, then the activator (previously prepared as described below) is charged, followed by a mixture of the styrene and Sulfole B-8. The reactor is cooled to about 5 to 0 degrees C. and the butadiene is added. The cumene hydroperoxide is then added and polymerization is allowed to proceed, under conventional stirring or agitation, for the time period and at the temperature stated. The resulting latex has excellent fluidity and stability. The unreacted monomers are stripped off in the usual way. While it cannot be coagulated with the usual amounts of acid and salt, or amounts substantially in excess thereof, it is readily coagulated by aluminum sulfate. An amount of about 2% of $Al_2(SO_4)_3 \cdot 18H_2O$ (based on the weight of the butadiene and styrene monomers), added as a 5% aqueous solution, coagulates the latex satisfactorily.

Preparation of activator:
Activator formula (parts by weight):

| | |
|---|---|
| $Na_4P_2O_7 \cdot 10H_2O$ _____g__ | 5.0 |
| $FeSO_4 \cdot 7H_2O$ _____g__ | 2.2 |
| Dextrose _____g__ | 5.0 |
| KCl _____g__ | 1.25 |
| Water (oxygen-free) to make total volume _____ml__ | 100 |

The usual precautions are taken to exclude oxygen during the preparation of the activator. To the sodium pyrophosphate dissolved in 15 ml. of oxygen-free water is added a solution of the ferrous sulfate in 15 ml. of oxygen-free water. The resulting mixture is heated at 60 degrees C. while agitating it, and thereupon the dextrose and the KCl and the balance of the oxygen-free water are added. The solution is heated at 60 degrees C. for about ¾ hour to 1 hour. In place of the sodium pyrophosphate, anhydrous potassium pyrophosphate (2.75 g.) can be used with essentially the same results.

If 2.88 parts of the aqueous solution of the oleic acid amide of isopropanolamine sulfosuccinate (Na salt) (1.01 parts of active material) is used instead of the 3.76 parts stated in Example A, the conditions otherwise remaining the same, a conversion of 70% is obtained in 16 hours.

If 2.0 parts of the aqueous solution of the oleic acid amide of isopropanolamine sulfosuccinate (Na salt) (0.7 part of active material) is used instead of the 3.76 parts stated in Example A, and 0.13 part of n-octyl dimethyl methyl hydroperoxide is used in place of the cumene hydroperoxide, the conditions otherwise remaining the same, a conversion of 93% is obtained in 15 hours.

*Example B*

| | |
|---|---|
| Butadiene _____ | 70.0 |
| Styrene _____ | 30.0 |
| Water (redistilled) _____ | 180.0 |
| Sulfole B–8 _____ | 0.24 |
| Oleic acid amide of isopropanolamine sulfosuccinate (Na salt) in the form of a 35% active aqueous solution (pH 5.5 to 6) _____ | [1] 1.0 |
| Potassium stearate flakes _____ | 2.0 |
| $K_4P_2O_7$ _____ | 0.22 |
| $FeSO_4 \cdot 7H_2O$ _____ | 0.18 |
| Dextrose _____ | 1.0 |
| KCl _____ | 0.4 |
| Diisopropylbenzene monohydroperoxide _____ | 0.07 |
| Temperature _____degrees C__ | 2 to 4 |
| Time _____hours__ | 10.5 |
| Conversion _____percent__ | 80 |

[1] Active agent comprises 0.35.

The procedure followed in this Example B is the same as described above in Example A, except for the differences indicated. The resulting latex has excellent fluidity and stability. It is readily coagulated with from 1 to 1.5% of $Al_2(SO_4)_3 \cdot 18H_2O$ (based on the weight of the butadiene and styrene monomers), added as a 5% aqueous solution.

If 0.13 part of n-octyl dimethyl methyl hydroperoxide is substituted for the diisopropylbenzene monohydroperoxide in this Example B, a conversion of 60% is obtained in 8.5 hours at a temperature of 1 to 2 degrees C.

*Example C*

| | |
|---|---|
| Butadiene _____ | 70.0 |
| Styrene _____ | 30.0 |
| Water (redistilled) _____ | 180.0 |
| Sulfole B–8 _____ | 0.24 |
| Oleic acid amide of isopropanolamine sulfosuccinate (Na salt) in the form of a 35% active aqueous solution (pH 5.5 to 6) _____ | [1] 1.0 |
| Dresinate 731 (70% active material in the form of potassium soaps of disproportionated rosin acids) _____ | [2] 3.0 |
| $Na_4P_2O_7 \cdot 10H_2O$ _____ | 0.3 |
| $FeSO_4 \cdot 7H_2O$ _____ | 0.18 |
| Dextrose _____ | 1.0 |
| KCl _____ | 0.4 |
| Diisopropylbenzene monohydroperoxide _____ | 0.7 |
| Temperature _____degrees C__ | 3 to 5 |
| Time _____hours__ | 14.5 |
| Conversion _____percent__ | 75 to 80 |

[1] Active agent comprises 0.35.
[2] Active agent comprises 2.1.

The procedure followed in this Example C is the same as described above in Example A, except for the differences indicated. The resulting latex has excellent fluidity and stability. It is readily coagulated with alum as described above.

If the amount of activator is reduced, for example, to 0.18 part $Na_4P_2O_7 \cdot 10H_2O$, 0.11 part $FeSO_4 \cdot 7H_2O$, 0.6 dextrose and 0.24 KCl, the conversion is 70 to 75% in 14.5 hours. If, at this lower activator level, an equivalent amount of potassium pyrophosphate is substituted for the sodium pyrophosphate, the conversion is 60% in 14.5 hours.

*Example D*

| | |
|---|---|
| Butadiene _____ | 60.0 |
| Styrene _____ | 40.0 |
| Regulator (mixture of decyl, dodecyl and tetradecyl mercaptans) _____ | 0.25 |
| Water (redistilled) _____ | 180.0 |
| Refined tall oil acid amides of monoethanolamine sulfosuccinate (Na salt) _____ | 2.5 |
| Potassium persulfate _____ | 0.3 |
| Temperature _____degrees C__ | 40 |
| Time _____hours__ | 13 |
| Conversion _____percent__ | 65 |

The polymerization is effected with gentle stirring in a closed reactor and, at the end of 13 hours, the reaction is stopped and the unreacted monomers stripped in the usual way. The resulting latex has excellent properties and is coagulated by alum as described above.

After stripping and prior to coagulation, carbon blacks and other agents can, if desired, be added to the latices and then coagulation of the latter effected. In this connection, it is of particular advantage to form an aqueous suspension of the carbon black in water to which has been added a small percentage of one of the agents of the present invention, for example, the oleic acid amide of isopropanolamine sulfosuccinate (Na salt), then to add said suspension to the synthetic latex in appropriate or desired amounts, and thereafter to effect coagulation of the latex, for example, by the addition of alum. By way of illustration, to a synthetic latex made in accordance with our present invention, in the form of an aqueous dispersion containing from 33% to 50% by weight of latex solids, for each 100 parts of latex solids there is added a dispersion or suspension of 40 to 60, for example, 50 parts of carbon black in 40 to 100 parts of water to which has been added about 0.2 to about 0.6 part of the oleic acid amide of isopropanolamine sulfosuccinate (Na salt). The carbon black suspension is stable and homogeneous and serves to produce an excellent dispersion of the carbon black throughout the latex when the latter is coagulated.

While our invention has been described in detail, no unnecessary limitations should be read thereinto, the scope of the invention being set forth in the appended claims.

What we claim as new and desire to protect by Letters Patent of the United States is:

1. In the preparation of synthetic latices by the emulsion polymerization of mixtures of butadiene and styrene in which the butadiene predominates, the step which comprises carrying out said polymerization in the presence of a small proportion of a chemical compound in the form of an hydroxyalkyl primary amine in which amine hydrogen is replaced by an aliphatic carboxylic acid acyl radical containing from 8 to 24 carbon atoms and in which hydroxyl hydrogen is replaced by an aliphatic sulfopolycarboxylic acid acyl radical containing from 4 to 8 carbon atoms.

2. In the preparation of synthetic latices by the emulsion polymerization, at temperatures of the order of about −15 to +25 degrees C., of mixtures of butadiene and styrene in which the butadiene predominates, the step which comprises carrying out said polymerization in the presence of a small proportion of a chemical compound in the form of an hydroxyalkyl primary amine in which amine hydrogen is replaced by a fatty acid acyl radical containing from 12 to 18 carbon atoms and in which hydroxyl hydrogen is replaced by an aliphatic sulfodicarboxylic acid acyl radical containing from 4 to 8 carbon atoms.

3. In the preparation of synthetic latices by the emulsion polymerization, at temperatures of the order of about −15 to +25 degrees C., of mixtures of butadiene and styrene in which the butadiene predominates, the step which comprises carrying out said polymerization in the presence of small proportions of an alkali metal soap and a chemical compound in the form of a hydroxyalkyl primary amine in which amine hydrogen is replaced by an aliphatic carboxylic acid acyl radical containing from 8 to 24 carbon atoms and in which hydroxyl hydrogen is replaced by an aliphatic sulfopolycarboxylic acid, alkali metal salt, acyl radical containing from 4 to 8 carbon atoms.

4. In the preparation of synthetic latices by the emulsion polymerization of mixtures of butadiene and styrene in which the butadiene predominates, the step which comprises carrying out said polymerization in the presence of small proportions of an alkali metal rosin soap and the oleic acid amide of monoethanolamine sulfosuccinate, alkali metal salt.

5. In the preparation of synthetic latices by the emulsion polymerization of mixtures of butadiene and styrene in which the butadiene predominates, the step which comprises carrying out said polymerization in the cold and in the presence of small proportions of an alkali metal rosin soap and the oleic acid amide of isopropanolamine sulfosuccinate, alkali metal salt.

6. In the preparation of synthetic latices by the emulsion polymerization, at temperatures of the order of about −15 to +25 degrees C., of mixtures of butadiene and styrene in which the butadiene predominates, the step which comprises carrying out said polymerization in the presence of an alkali metal rosin soap and the oleic acid amide of an hydroxy-alkyl primary amine sulfosuccinate, sodium salt, said alkali metal rosin soap being present in proportions of about 1% to 4% and the oleic acid amide of the hydroxy-alkyl primary amine sulfosuccinate, sodium salt, being present in proportions of about 0.2% to 4%, said proportions being based on the weight of the butadiene and styrene monomers and said soap and said amide being present in a total amount not substantially exceeding 4%.

7. A new and improved butadiene-styrene, in which the butadiene predominates, synthetic rubber latex characterized by enhanced stability, improved fluidity and resistance to coagulation, said synthetic rubber latex being characterized by the presence therein of a small proportion of a chemical compound in the form of an hydroxyalkyl primary amine in which amine hydrogen is replaced by an aliphatic carboxylic acid acyl radical containing from 8 to 24 carbon atoms and in which hydroxyl hydrogen is replaced by an aliphatic sulfocarboxylic acid acyl radical containing from 4 to 8 carbon atoms.

8. A new and improved butadiene-styrene, in which the butadiene predominates, synthetic rubber latex characterized by enhanced stability, improved fluidity and resistance to coagulation, said synthetic rubber latex being characterized by the presence therein of small proportions of an alkali metal soap and a chemical compound in the form of a hydroxy-alkyl primary amine in which amine hydrogen is replaced by an aliphatic carboxylic acid acyl radical containing from 8 to 24 carbon atoms and in which hydroxyl hydrogen is replaced by an aliphatic sulfocarboxylic acid, alkali metal salt, acyl radical containing from 4 to 8 carbon atoms.

9. A new and improved butadiene-styrene, in which the butadiene predominates, synthetic-rubber latex characterized by enhanced stability, improved fluidity and resistance to coagulation, said synthetic rubber latex being characterized by the presence therein of small proportions of an alkali metal soap and the oleic acid amide of monoethanolamine sulfosuccinate, alkali metal salt.

10. A new and improved butadiene-styrene, in which the butadiene predominates, synthetic rubber latex characterized by enhanced stability, improved fluidity and resistance to coagulation, said synthetic rubber latex being characterized by the presence therein of small proportions of an alkali metal rosin soap and the oleic acid amide of isopropanolamine sulfosuccinate, alkali metal salt.

11. A new and improved butadiene-styrene, in which the butadiene predominates, synthetic rubber latex characterized by enhanced stability, improved fluidity and resistance to coagulation, said synthetic rubber latex being characterized by the presence therein of an alkali metal rosin soap and the oleic acid amide of an hydroxy-alkyl primary amine sulfosuccinate, sodium salt, said alkali metal rosin soap being present in proportions of about 1% to 4% and the oleic acid amide of the hydroxy-alkyl primary amine sulfosuccinate, sodium salt, being present in proportions of about 0.2 to 4%, said proportions being based on the weight of the butadiene and styrene monomers and said soap and said amide being present in a total amount not substantially exceeding 4%.

References Cited in the file of this patent

UNITED STATES PATENTS

| | | |
|---|---|---|
| 2,236,530 | Epstein et al. | Apr. 1, 1941 |
| 2,475,016 | De Nie | July 5, 1949 |
| 2,512,697 | Te Grotenhuis | June 27, 1950 |